United States Patent
Bae et al.

(10) Patent No.: US 11,319,438 B2
(45) Date of Patent: May 3, 2022

(54) POLYESTER RESIN COMPOSITION AND ARTICLE INCLUDING THE SAME

(71) Applicant: Lotte Advanced Materials Co., Ltd., Yeosu-si (KR)

(72) Inventors: Yunseok Bae, Uiwang-si (KR); Kyunha Ban, Uiwang-si (KR); Youngsub Jin, Uiwang-si (KR)

(73) Assignee: Lotte Advanced Materials Co., Ltd., Yeosu-si (KR)

( * ) Notice: Subject to any disclaimer, the term of this patent is extended or adjusted under 35 U.S.C. 154(b) by 96 days.

(21) Appl. No.: 16/525,867

(22) Filed: Jul. 30, 2019

(65) Prior Publication Data
US 2020/0040179 A1    Feb. 6, 2020

(30) Foreign Application Priority Data
Jul. 31, 2018    (KR) .................. 10-2018-0089602

(51) Int. Cl.
C08L 67/02    (2006.01)

(52) U.S. Cl.
CPC .......... *C08L 67/02* (2013.01); *C08L 2201/08* (2013.01); *C08L 2205/03* (2013.01)

(58) Field of Classification Search
CPC ................................... C08L 67/02
See application file for complete search history.

(56) References Cited

U.S. PATENT DOCUMENTS

| | | | |
|---|---|---|---|
| 8,410,227 B2 | 4/2013 | Eipper et al. | |
| 8,440,761 B2 | 5/2013 | Eipper et al. | |
| 8,716,378 B2 | 5/2014 | Ding et al. | |
| 2011/0144239 A1 | 6/2011 | Lee et al. | |
| 2011/0319536 A1 | 12/2011 | Ding et al. | |
| 2019/0002688 A1 | 1/2019 | Park et al. | |

FOREIGN PATENT DOCUMENTS

| | | |
|---|---|---|
| CN | 102093677 A | 6/2011 |
| CN | 103003359 A | 3/2013 |
| EP | 2813547 A1 | 12/2014 |
| EP | 2813547 B1 | 12/2014 |

(Continued)

OTHER PUBLICATIONS

English Machine Translation JPH10-316844A Obtained Jan. 29, 2021 at https://worldwide.espacenet.com/publicationDetails/biblio?CC=JP&NR=H10316844A&KC=A&FT=D&ND=3&date=19981202&DB=EPODOC&locale=en_EP#.*

(Continued)

*Primary Examiner* — Arrie L Reuther
(74) *Attorney, Agent, or Firm* — Additon, Pendleton & Witherspoon, P.A.

(57) ABSTRACT

Disclosed are a polyester resin composition including (A) about 100 parts by weight of a polybutylene terephthalate (PBT) resin; (B) greater than or equal to about 0.01 parts by weight and less than about 0.1 parts by weight of a phenol-based antioxidant; (C) greater than or equal to about 0.01 parts by weight and less than about 0.1 parts by weight of a thioester-based antioxidant; (D) greater than or equal to about 0.01 parts by weight and less than 0.2 parts by weight of an ethylene acrylic acid-based copolymer; and (E) greater than or equal to about 0.01 parts by weight and less than 0.2 parts by weight of montan wax, and an article made using the same.

8 Claims, 4 Drawing Sheets

(56) References Cited

FOREIGN PATENT DOCUMENTS

| | | |
|---|---|---|
| JP | 10-316844 A | 12/1998 |
| KR | 10-2007-0001992 A | 1/2007 |
| KR | 10-2008-0037033 A | 4/2008 |
| KR | 10-2013-0100923 A | 9/2013 |
| KR | 10-2014-0144083 A | 12/2014 |
| KR | 10-2016-0001631 A | 1/2016 |
| KR | 10-2017-0074692 A | 6/2017 |
| KR | 10-2018-0039358 A | 4/2018 |
| WO | 2016-076135 A1 | 8/2017 |
| WO | 2016-076136 A1 | 8/2017 |

OTHER PUBLICATIONS

Notice of Allowance dated May 31, 2021, with Search Report dated May 12, 2021, in counterpart Chinese Application No. 201910698383.7, pp. 1-7.

* cited by examiner

POLYESTER RESIN COMPOSITION AND ARTICLE INCLUDING THE SAME

CROSS-REFERENCE TO RELATED APPLICATION

This application claims priority to and the benefit of Korean Patent Application No. 10-2018-0089602 filed in the Korean Intellectual Property Office on Jul. 31, 2018, the entire disclosure of which is incorporated herein by reference.

FIELD

A polyester resin composition and an article including the same are disclosed.

BACKGROUND

Conventionally, a metal-deposition reflector such as a head lamp bezel for a vehicle, a reflector, lighting equipment, and the like is manufactured by depositing a metal after painting a primer on a resin article to increase surface smoothness of the light reflecting surface thereof. However, this conventional method is not environment-friendly due to an organic solvent included in the primer, can be expensive, and can have low productivity due to volatilization and the amount of time required for film formation.

Because of these problems, there is increased interest in a direct deposition method wherein the metal is directly deposited without the primer on the surface of a resin article. The direct deposition method requires high surface smoothness of the resin article. Also, when the resin article is used as a head lamp bezel for a vehicle, light equipment, or the like, there is a need to minimize gas generation and migration of a pyrolysis material at high temperatures.

As metal-deposition reflectors have become thinner, larger, and more complicated, polybutylene terephthalate (PBT) resin has received interest as an appropriate material. The polybutylene terephthalate resin is crystalline unlike a noncrystalline polycarbonate-based resin and has high flowability at a process temperature of a greater than or equal to a melting point and thus has excellent moldability for a complicated and large-sized metal-deposition reflector.

However, when a highly flowable and crystalline polybutylene terephthalate resin is used to mold a complicated and large-sized metal-deposition reflector, an annual ring-shaped flow-mark may be generated on the surface thereof due to a cooling and crystallization rate difference as a result of the high flowability and crystallinity. Accordingly, there is a need for a composition including a highly flowable and crystalline polybutylene terephthalate resin that can also provide high surface smoothness and excellent appearance.

SUMMARY OF THE INVENTION

The present disclosure relates to a polyester resin composition capable of ensuring a high surface smoothness and excellent appearance so that a metal may be deposited directly on an article formed of the polyester resin composition with minimal or no deterioration of other properties even when using high-flowability crystalline polybutylene terephthalate resin, and to an article made using the same.

The polyester resin composition includes (A) about 100 parts by weight of a polybutylene terephthalate (PBT) resin; (B) greater than or equal to about 0.01 parts by weight and less than about 0.1 parts by weight of a phenol-based antioxidant; (C) greater than or equal to about 0.01 parts by weight and less than about 0.1 parts by weight of a thioester-based antioxidant; (D) greater than or equal to about 0.01 parts by weight and less than 0.2 parts by weight of an ethylene acrylic acid-based copolymer; and (E) greater than or equal to about 0.01 parts by weight and less than 0.2 parts by weight of montan wax.

The (A) polybutylene terephthalate resin may have an intrinsic viscosity of about 0.8 dl/g to about 0.9 dl/g.

The (A) polybutylene terephthalate resin may include a polybutylene terephthalate polymer obtained by a condensation polymerization of 1,4-butanediol and terephthalic acid and/or by a direct esterification reaction and/or an ester exchange reaction of dimethyl terephthalate.

The (D) ethylene acrylic acid-based copolymer may include an ethylene acrylic acid copolymer, an ethylene methacrylic acid copolymer, an ethylene acrylic acid ester copolymer, an ethylene methacrylic acid ester copolymer, or a combination thereof.

The (E) montan wax may include montanic acid wax, montan ester wax, montanic acid ester wax, or a combination thereof.

The present disclosure also relates to an article formed using the aforementioned polyester resin composition.

The article may exhibit a gas generation amount of less than or equal to about 100 ppm when fogging is evaluated at a temperature of 250° C. for 3 hours.

The article may exhibit a melt flow index of greater than or equal to about 71 g/10 min when measured according to ASTM D1238 at a temperature of about 250° C. and a force of about 2.16 kg.

The article may exhibit a thermal distortion temperature of greater than or equal to about 169° C. measured according to ASTM D648 under a force of about 0.45 MPa.

The polyester resin composition may exhibit a high surface smoothness and excellent appearance so that a metal may be deposited directly on an article formed of the polyester resin composition with minimal or no deterioration of other properties even when using high-flowability crystalline polybutylene terephthalate resin.

Also, it is possible to easily form an article having a more complicated, thinner, and larger structure using the polyester resin composition.

BRIEF DESCRIPTION OF THE DRAWINGS

FIG. 1 is an image showing the surface of an article prepared using the polyester resin composition of Example 1 before metal deposition, and FIG. 2 is an image showing the surface of an article prepared using the polyester resin composition of Example 1 after metal deposition, FIG. 3 is an image showing the surface of an article prepared using the polyester resin composition of Comparative Example 1 before metal deposition, and FIG. 4 is an image showing the surface of an article prepared using the polyester resin composition of Comparative Example 1 after metal deposition.

DETAILED DESCRIPTION OF THE EMBODIMENTS

Figure 1:
FIGS. 1 and 2 are images showing appearances of articles prepared using the polyester resin composition according to Example 1, specifically.

The above and other aspects, features, and advantages of the present invention will become apparent from the detailed description of the following embodiments and the accompanying drawings. It should be understood that the present invention is not limited to the following embodiments and may be embodied in different ways by those skilled in the art without departing from the scope of the present invention. Rather, the embodiments are provided for complete disclosure and to provide thorough understanding of the present invention by those skilled in the art. The scope of the present invention should be defined only by the appended claims.

A polyester resin composition according to an embodiment includes (A) about 100 parts by weight of a polybutylene terephthalate (PBT) resin; (B) greater than or equal to about 0.01 parts by weight and less than about 0.1 parts by weight of a phenol-based antioxidant; (C) greater than or equal to about 0.01 parts by weight and less than about 0.1 parts by weight of a thioester-based antioxidant; (D) greater than or equal to about 0.01 parts by weight and less than 0.2 parts by weight of an ethylene acrylic acid-based copolymer; and (E) greater than or equal to about 0.01 parts by weight and less than 0.2 parts by weight of montan wax.

Hereinafter, each component of the polyester resin composition is described in detail.

(A) Polybutylene Terephthalate Resin

As used herein, the term polybutylene terephthalate (PBT) resin refers to a polybutylene terephthalate homopolymer and/or a polybutylene terephthalate copolymer.

The polybutylene terephthalate resin may be a polybutylene terephthalate polymer obtained by a condensation polymerization of 1,4-butanediol and terephthalic acid and/or by a direct esterification reaction and/or an ester exchange reaction of dimethyl terephthalate.

In addition, a copolymer obtained by copolymerizing the polybutylene terephthalate polymer with an impact-improving component such as polytetramethylene glycol (PTMG), polyethylene glycol (PEG), polypropylene glycol (PPG), aliphatic polyester, aliphatic polyamide, and the like, and combinations thereof and/or a modified polybutylene terephthalate resin which is a composition obtained by blending the polybutylene terephthalate with one or more of these components may be used in order to improve impact strength of the polybutylene terephthalate resin and modify the surface thereof.

In addition, the polybutylene terephthalate resin may have an intrinsic viscosity ($\eta$) of about 0.80 dl/g to about 0.90 dl/g, for example about 0.80 dl/g to about 0.88 dl/g, about 0.80 dl/g to about 0.86 dl/g, about 0.82 dl/g to about 0.86 dl/g, and as another example about 0.83 dl/g to about 0.84 dl/g. In some embodiments, the polybutylene terephthalate resin may have an intrinsic viscosity ($\eta$) about 0.80, 0.81, 0.82, 0.83, 0.84, 0.85, 0.86, 0.87, 0.88, 0.89, or 0.90 dl/g. Further, according to some embodiments, the intrinsic viscosity may be in a range from about any of the foregoing values to about any other of the foregoing values. The intrinsic viscosity ($\eta$) may be measured according to ASTM D2857 at a temperature of about 30° C. by using a solvent mixture of about 50:50 by weight of phenol and 1,1,2,2-tetrachloroethane.

When the intrinsic viscosity of the polybutylene terephthalate resin is within the above ranges, the polyester resin composition including the polybutylene terephthalate resin may secure high flowability, thus securing the moldability of a large and complicated structure.

The polyester resin composition includes about 100 parts by weight of the polybutylene terephthalate resin and thus can exhibit excellent overall properties such as flowability, surface smoothness, and the like and also excellent moldability for a complicated structure, compared with a composition including a different polyester resin from the polybutylene terephthalate resin, for example, a polyethylene terephthalate resin. In addition, the aforementioned excellent properties may be secured, compared with a composition including a mixture of the polybutylene terephthalate resin with other polyester resins.

(B) Phenol-Based Antioxidant

The phenol-based antioxidant can prevent oxidation of the polyester resin composition, while also thermally stabilizing the polyester resin composition.

The type of phenol-based antioxidant is not particularly limited, and a variety of commercially available phenol-based antioxidants may be used. Non-limiting examples of the phenol-based antioxidant include hindered phenol antioxidant compounds. Hindered phenol antioxidant compounds are also well known in the art and are commercially available.

The phenol-based antioxidant may be included in an amount of greater than or equal to about 0.01 parts by weight and less than about 0.1 parts by weight based on about 100 parts by weight of the polybutylene terephthalate resin (A). For example, the polyester resin composition may include the phenol-based antioxidant in an amount of greater than or equal to about 0.02 parts by weight and less than about 0.1 parts by weight, greater than or equal to about 0.03 parts by weight and less than about 0.1 parts by weight, greater than or equal to about 0.04 parts by weight and less than about 0.1 parts by weight, about 0.04 to about 0.08 parts by weight, about 0.04 to about 0.06 parts by weight, and/or about 0.05 parts by weight. In some embodiments, the polyester resin composition may include the phenol-based antioxidant in an amount of about 0.01, 0.02, 0.03, 0.04, 0.05, 0.06, 0.07, 0.08, or 0.09 parts by weight, based on about 100 parts by weight of the polybutylene terephthalate resin. Further, according to some embodiments, the amount of the phenol-based antioxidant may be in a range from about any of the foregoing amounts to about any other of the foregoing amounts.

When the phenol-based antioxidant is present in an amount within the above range, the polyester resin composition including this phenol-based antioxidant and an article made using the same may have an excellent appearance by minimizing thermal decomposition of the polyester at high temperatures and thus minimizing discoloration and/or gas generation.

(C) Thioester-Based Antioxidant

The thioester-based antioxidants, like the aforementioned phenol-based antioxidant, may function to thermally stabilize the polyester resin composition. The type of thioester-based antioxidant is not particularly limited, and commercially available antioxidants having various thioester bonds may be used.

The thioester-based antioxidant may be included in an amount of greater than or equal to about 0.01 parts by weight and less than about 0.1 parts by weight based on about 100 parts by weight of the polybutylene terephthalate resin (A). For example, the polyester resin composition may include the thioester-based antioxidant in an amount of greater than or equal to about 0.02 parts by weight and less than about 0.1 parts by weight, greater than or equal to about 0.03 parts by weight and less than about 0.1 parts by weight, greater than or equal to about 0.04 parts by weight and less than about 0.1 parts by weight, about 0.04 to about 0.08 parts by weight, about 0.04 to about 0.06 parts by weight, and/or about 0.05 parts by weight. In some embodiments, the polyester resin composition may include the thioester-based antioxidant in an amount of about 0.01, 0.02, 0.03, 0.04, 0.05, 0.06, 0.07, 0.08, or 0.09 parts by weight, based on about 100 parts by weight of the polybutylene terephthalate resin. Further, according to some embodiments, the amount of the thioester-based antioxidant may be in a range from about any of the foregoing amounts to about any other of the foregoing amounts.

The polyester resin composition uses the aforementioned phenol-based antioxidant and thioester-based antioxidant together. Accordingly, thermal stability of the polyester resin composition may be further improved. For example, when the polyester resin composition is used to manufacture an article such as a head lamp bezel for a vehicle and the like, excellent appearance may be secured by minimizing decomposition of the polyester resin composition by high-temperature heat generated from the head lamp and thus minimizing discoloration and/or gas generation.

(D) Ethylene Acrylic Acid-Based Copolymer

As used herein, the term ethylene acrylic acid-based copolymer refers to an ethylene acrylic acid copolymer and/or an ethylene acrylic acid ester copolymer.

Examples of the ethylene acrylic acid-based copolymer may include without limitation ethylene acrylic acid copolymers, ethylene methacrylic acid copolymers, ethylene acrylic acid ester copolymers, ethylene methacrylic acid ester copolymers, and the like, and combinations thereof.

Examples of an acrylic acid ester monomer of the ethylene acrylic acid ester copolymer may include without limitation acrylic acid ester monomers such as methyl acrylate, ethyl acrylate, propyl acrylate, butyl acrylate, pentyl acrylate, hexyl acrylate, octyl acrylate, 2-ethylhexyl acrylate, cyclohexyl acrylate, dodecyl acrylate, octadecyl acrylate, phenyl acrylate, benzyl acrylate, and the like and combinations thereof.

Examples of a methacrylic acid ester monomer of the ethylene methacrylic acid ester copolymer may include without limitation methyl methacrylate, ethyl methacrylate, propyl methacrylate, butyl methacrylate, pentyl methacrylate, hexyl methacrylate, octyl methacrylate, 2-ethylhexyl methacrylate, cyclohexyl methacrylate, dodecyl methacrylate, octadecyl methacrylate, phenyl methacrylate, benzyl methacrylate, and the like and combinations thereof.

The ethylene acrylic acid-based copolymer can impart appropriate release properties to the polyester resin composition and simultaneously, has low volatility at a high temperature and accordingly may secure excellent appearance by minimizing gas generation due to thermal decomposition of the resin when exposed to high-temperature heat.

The ethylene acrylic acid-based copolymer may be included in an amount of greater than or equal to about 0.01 parts by weight and less than 0.2 parts by weight based on about 100 parts by weight of the polybutylene terephthalate resin (A). For example, the polyester resin composition may include the ethylene acrylic acid-based copolymer in an amount of greater than or equal to about 0.05 parts by weight and less than 0.2 parts by weight, about 0.05 parts by weight to about 0.15 parts by weight, about 0.08 to about 0.12 parts by weight, and/or about 0.1 parts by weight. In some embodiments, the polyester resin composition may include the ethylene acrylic acid-based copolymer in an amount of about 0.01, 0.02, 0.03, 0.04, 0.05, 0.06, 0.07, 0.08, 0.09, 0.1, 0.11, 0.12, 0.13, 0.14, or 0.15 parts by weight, based on about 100 parts by weight of the polybutylene terephthalate resin. Further, according to some embodiments, the amount of the ethylene acrylic acid-based copolymer may be in a range from about any of the foregoing amounts to about any other of the foregoing amounts.

When the ethylene acrylic acid-based copolymer is present in an amount within the above ranges, the polyester resin composition including this ethylene acrylic acid-based copolymer and an article made using the same may have excellent heat resistance and release properties and can have an excellent appearance by minimizing gas generation at a high temperature.

For example, a polyester resin composition including the ethylene acrylic acid-based copolymer in an amount of greater than or equal to 0.2 parts by weight, and an article made using the same, may have deteriorated heat resistance or/and increased gas generation at a high temperature.

(E) Montan Wax

The montan wax is a type of mineral wax and may be a form of montanic acid through an oxidation from montan wax raw material extracted from lignite. From this, various types of waxes (saponified wax, esterified wax, a mixture thereof, etc.) may be produced.

The montan wax like the above ethylene acrylic acid-based copolymer also can impart appropriate release properties to the polyester resin composition and has low volatility at a high temperature and accordingly, may secure excellent appearance by minimizing gas generation due to thermal decomposition of the resin composition when exposed to high-temperature heat.

Examples of the montan wax may include without limitation montanic acid wax, montan ester wax, montanic acid ester wax, and the like, and combinations thereof. For example, the montan wax may be a montanic acid type, an ester-type, and/or a partially saponified ester-type wax. For example, a partially saponified montan ester wax may be used. Montan waxes described herein, including montan waxes, montanic acid waxes, montan ester waxes, and/or montanic acid ester waxes, are well known in the art and are commercially available.

The montan wax may be included in an amount of greater than or equal to about 0.01 parts by weight and less than 0.2 parts by weight based on about 100 parts by weight of the polybutylene terephthalate resin (A). For example, the polyester resin composition may include the montan wax in an amount of greater than or equal to about 0.02 parts by weight and less than about 0.1 parts by weight, about 0.03 parts by weight to about 0.08 parts by weight, about 0.04 to about 0.06 parts by weight, and/or about 0.05 parts by weight. In some embodiments, the polyester resin composition may include the montan wax in an amount of about 0.01, 0.02, 0.03, 0.04, 0.05, 0.06, 0.07, 0.08, 0.09, or 0.1 parts by weight, based on about 100 parts by weight of the polybutylene terephthalate resin. Further, according to some embodiments, the amount of the montan wax may be in a range from about any of the foregoing amounts to about any other of the foregoing amounts.

For example, a polyester resin composition including the montan wax in an amount of greater than or equal to about 0.2 parts by weight, and an article made using the same, may have deteriorated heat resistance and/or increased gas generation at a high temperature.

When the polyester resin composition includes montan wax in an amount within the above range along with the above ethylene acrylic acid-based copolymer, the polyester resin composition and an article made using the same may have greatly suppressed gas generation at a high temperature.

(F) Other Additives

The polyester resin composition may further include one or more other additives depending on the needs of the end use and/or in order to balance the properties, under conditions that satisfy the aforementioned heat resistance, flowability, surface smoothness, and excellent appearance characteristic. Examples of the other additives may include without limitation flame retardants, nucleating agents, coupling agents, fillers, plasticizers, impact-reinforcing agents, lubricants, antibacterial agents, release agents, inorganic material additives, ultraviolet (UV) stabilizers, antistatic agents, pigments, dyes, and the like and these may be used alone or in a combination of two or more.

The other additives may appropriately be included within a range that does not interfere with physical properties of the polyester resin composition, for example may be in an amount of less than or equal to about 40 parts by weight, and as another example about 0.1 parts by weight to about 30 parts by weight based on about 100 parts by weight of the polybutylene terephthalate resin (A).

The aforementioned polyester resin composition may be prepared by a known method of preparing a resin composition. For example, the components according to one embodiment and other optional additives can be simultaneously mixed, and the mixture can be melt-kneaded in an extruder and manufactured as pellets.

The present disclosure also relates to an article made using the polyester resin composition.

The article may be manufactured using various processes such as but not limited to injection molding, blow molding, extrusion molding, thermal molding, and the like by using the polyester resin composition.

The article may exhibit a gas generation amount of less than or equal to about 100 ppm when fogging is evaluated at a temperature of 250° C. for 3 hours.

The article may exhibit a flow index of greater than or equal to about 71 g/10 min measured according to ASTM D1238 at a temperature of about 250° C. under a load of about 2.16 kg.

The article may exhibit a thermal distortion temperature (also referred to as a heat deflection temperature or heat distortion temperature) of greater than or equal to about 169° C. measured according to ASTM D648 under a load of about 0.45 MPa.

The article may not only have excellent mechanical properties such as impact resistance and the like, heat resistance, and flowability, but also gas generation at a high temperature may be greatly reduced, and accordingly, the article may be usefully applied to various electronic parts, auto parts, and the like. For example, the article may be used for a head lamp bezel for a vehicle, a reflector, and the like but is not limited thereto.

In addition, since the article has high surface smoothness, release properties, heat resistance, and reduced gas generation and thus excellent appearance, a direct deposition method of directly depositing a metal such as Al and the like without applying a primer and the like on the surface of the article may be used.

Hereinafter, the present invention is illustrated in more detail with reference to the following examples and comparative examples. However, the following examples and comparative examples are provided for the purpose of description only and the present invention is not limited thereto.

Example and Comparative Examples 1 to 5

Components shown in Table 1 are mixed in the following amounts and extruded into pellet-shaped resin compositions. The extrusion is performed by using a twin-screw extruder having L/D=29 and a diameter of 45 mm, and a barrel temperature is set at 240° C.

The pellets are dried at 100° C. for 4 hours, injection-molded by using a 6 oz injection molding machine set at a cylindrical temperature of 250° C. and a mold temperature of 40° C., and aged for 4 hours to manufacture specimens for measuring properties.

TABLE 1

|  | Ex. 1 | Comp. Ex. 1 | Comp. Ex. 2 | Comp. Ex. 3 | Comp. Ex. 4 | Comp. Ex. 5 |
| --- | --- | --- | --- | --- | --- | --- |
| (A) Polybutylene terephthalate resin (parts by weight) | 100 | 100 | 100 | 100 | 100 | 100 |
| (B) Phenol-based antioxidant (parts by weight) | 0.05 | 0.05 | 0.05 | 0.05 | 0 | 0.1 |
| (C) Thioester-based antioxidant (parts by weight) | 0.05 | 0 | 0.05 | 0 | 0 | 0.1 |
| (D) Ethylene acrylic acid copolymer (parts by weight) | 0.1 | 0 | 0.1 | 0.1 | 0.1 | 0.2 |
| (E) Montan wax (parts by weight) | 0.05 | 0 | 0 | 0 | 0.05 | 0.1 |
| (F) Phosphite-based antioxidant (parts by weight) | 0 | 0 | 0 | 0 | 0.05 | 0 |

Each component used in Table 1 is as follows.
(A) Polybutylene Terephthalate Resin
A polybutylene terephthalate resin having intrinsic viscosity ranging from 0.83 dl/g to 0.84 dl/g (PBT, Shinkong Synthetic Fibers Corp.) is used.
(B) Phenol-Based Antioxidant
Irganox® 1010 made by BASF SE is used.
(C) Thioester-Based Antioxidant
ADK STAB AO-412S manufactured by Adeka Corp. is used.
(D) Ethylene Acrylic Acid Copolymer
A-C® 540A made by Honeywell International Inc. is used.
(E) Montan Wax
Licowax® OP made by Clariant is used.
(F) Phosphite-Based Antioxidant
Doverphos® S-9228 made by Dover Chemical Corp. is used.

Evaluation Examples

The following properties of the specimens for measuring properties are evaluated, and the results are shown in Table 2.
(1) Impact Resistance (kgf·cm/cm): Notched Izod impact strength of a ¼"-thick specimen is measured according to ASTM D256 at room temperature.

(2) Flowability (g/10 min): Melt flow index is measured at 250° C. under a load of 2.16 kg according to ASTM D1238.

(3) Heat Resistance (° C.): Thermal distortion temperature is measured under a load of 0.45 MPa according to ASTM D648.

(4) Gas Generation Amount (ppm): 5 g of each manufactured pellet is put in a glass petri dish (diameter: 50 mm, height: 10 mm, thickness: 2 mm), covered with another glass petri dish (diameter: 60 mm, height: 10 mm, thickness: 2 mm), and heated on a 250° C. hot plate for 3 hours, and then, a weight difference before and after heating the glass petri dish used for the cover is divided by the pellet weight to obtain a generation amount of volatile gas deposited on the glass petri dish.

(5) Injection Moldability (mm): A mold having a spiral-shaped cavity having a thickness of 2 mm and a width of 14 mm is used, and a length (spiral flow length) of an article filled in the mold through injection molding at an injection temperature of 250° C. and a molding temperature of 60° C. is measured.

Figure 2:
Figure 3:
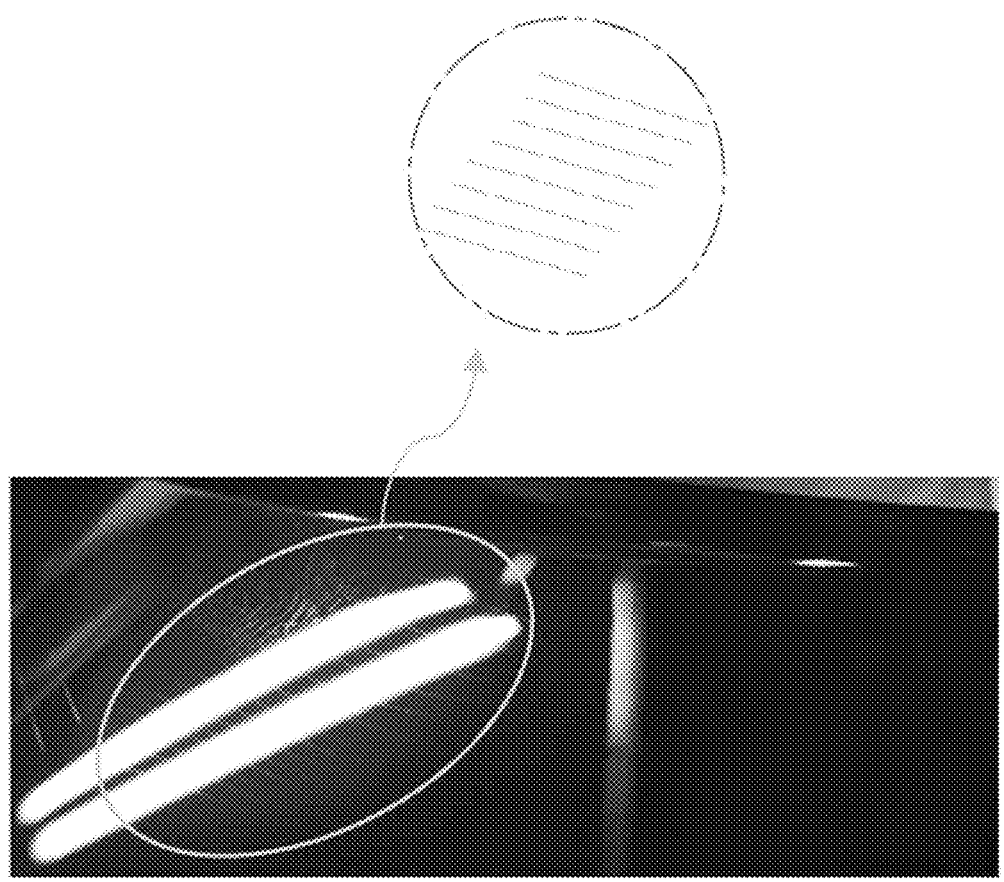
FIGS. 3 and 4 are images showing appearances of articles prepared using the polyester resin composition according to Comparative Example 1, specifically.
Figure 4:
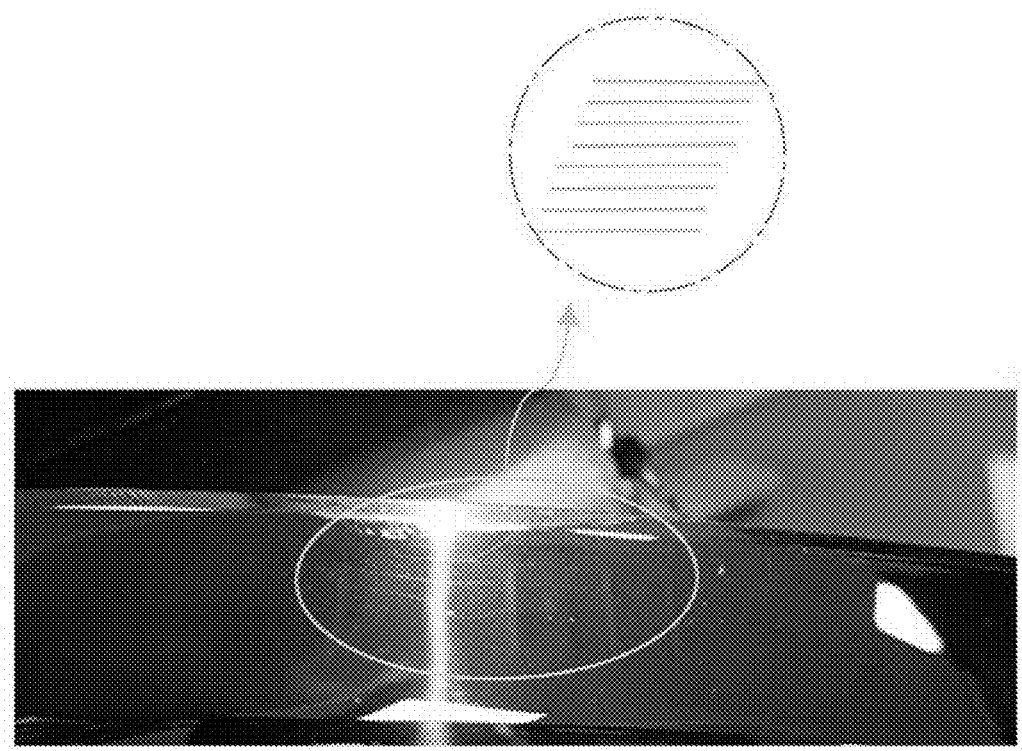

(6) Flow-mark is generated or not: FIGS. 1 and 2 are images showing appearances of articles prepared using the polyester resin composition according to Example 1, specifically: FIG. 1 is an image showing the surface of the article prepared using the polyester resin composition of Example 1 before metal deposition, and FIG. 2 is an image showing the surface of the article prepared using the polyester resin composition of Example 1 after metal deposition; and FIGS. 3 and 4 are images showing appearances of articles prepared using the polyester resin composition according to Comparative Example 1, specifically: FIG. 3 is an image showing the surface of the article prepared using the polyester resin composition of Comparative Example 1 before metal deposition, and FIG. 4 is an image showing the surface of the article prepared using the polyester resin composition of Comparative Example 1 after metal deposition.

As shown in the marked parts of FIGS. 3 and 4, whether or not a flow-mark before/after the metal deposition is generated on the surfaces of the articles is examined with the naked eye, and the results are shown in Table 2.

TABLE 2

|  | Ex. 1 | Comp. Ex. 1 | Comp. Ex. 2 | Comp. Ex. 3 | Comp. Ex. 4 | Comp. Ex. 5 |
| --- | --- | --- | --- | --- | --- | --- |
| Impact resistance (kgf · cm/cm) | 3.5 | 3.0 | 3.0 | 3.4 | 3.4 | 3.0 |
| Flowability (g/10 min) | 74 | 67 | 72 | 72 | 72 | 80 |
| Heat resistance (° C.) | 175 | 165 | 176 | 172 | 171 | 168 |
| Gas generation amount (ppm) | 90 | 180 | 90 | 200 | 220 | 250 |
| Injection moldability (mm) | 580 | 550 | 560 | 565 | 580 | 590 |
| Flow-mark is generated or not | No | Yes | Yes | Yes | Yes | No |

Referring to Tables 1 and 2, Example 1 including the phenol-based antioxidant, the thioester-based antioxidant, the ethylene acrylic acid copolymer, and the montan wax within the above ranges in the polybutylene terephthalate resin composition exhibits low gas generation amount of less than or equal to 100 ppm according to a fogging evaluation as well as maintains excellent impact resistance, flowability, injection moldability, and heat resistance compared with the Comparative Examples.

In addition, referring to Table 2 and FIGS. 1 to 4, as for an article formed of the polyester resin composition according to Example 1, a flow-mark is not observed on the surface of the article before/after the metal deposition, but as for the articles of Comparative Example 1, a flow-mark having a shape shown in the marked parts of FIGS. 3 to 4 before/after the metal deposition is observed.

Accordingly, an article manufactured by using the polyester resin composition of the present disclosure including Example 1 may have excellent surface smoothness and appearance compared with those of the Comparative Examples, and accordingly, a method of directly depositing a metal such as Al and the like without applying a primer and the like on the surface of the article is easy to use.

It is within the scope of this disclosure for one or more of the terms "substantially," "about," "approximately," and/or the like, to qualify each adjective and adverbs of the foregoing disclosure, to provide a broad disclosure. As an example, it is believed those of ordinary skill in the art will readily understand that, in different implementations of the features of this disclosure, reasonably different engineering tolerances, precision, and/or accuracy may be applicable and suitable for obtaining the desired result. Accordingly, it is believed those of ordinary skill will readily understand usage herein of the terms such as "substantially," "about," "approximately," and the like.

The use of the term "and/or" includes any and all combinations of one or more of the associated listed items.

The figures are schematic representations and so are not necessarily drawn to scale.

Exemplary embodiments have been disclosed herein, and although specific terms are employed, unless otherwise noted, they are to be interpreted in a generic and descriptive sense only and not for purpose of limitation. Also although some embodiments have been described above, it should be understood that these embodiments are provided for illustration only and are not to be construed in any way as limiting the present invention, and that various modifications, changes, alterations, and equivalent embodiments can be made by those skilled in the art without departing from the spirit and scope of the invention. The scope of the present invention should be defined by the appended claims and equivalents thereof.

What is claimed is:

1. An article formed using a polyester resin composition, the polyester resin composition comprising:
   (A) about 100 parts by weight of a polybutylene terephthalate (PBT) resin;
   (B) greater than or equal to about 0.01 parts by weight and less than about 0.1 parts by weight of a phenol-based antioxidant;
   (C) greater than or equal to about 0.01 parts by weight and less than about 0.1 parts by weight of a thioester-based antioxidant;
   (D) greater than or equal to about 0.01 parts by weight and less than or equal to about 0.1 parts by weight of an ethylene acrylic acid-based copolymer; and
   (E) greater than or equal to about 0.01 parts by weight and less than 0.2 parts by weight of montan wax,
   wherein the article exhibits a gas generation amount of less than or equal to about 100 ppm when fogging is evaluated at a temperature of 250° C. for 3 hours.

2. The article of claim 1, wherein the (A) polybutylene terephthalate resin has an intrinsic viscosity of about 0.8 dl/g to about 0.9 dl/g.

3. The article of claim 1, wherein the (A) polybutylene terephthalate resin comprises a polybutylene terephthalate polymer obtained by a condensation polymerization of 1,4-butanediol and terephthalic acid and/or by a direct esterification reaction and/or an ester exchange reaction of dimethyl terephthalate.

4. The article of claim 1, wherein the (D) ethylene acrylic acid-based copolymer comprises an ethylene acrylic acid copolymer, an ethylene methacrylic acid copolymer, an ethylene acrylic acid ester copolymer, an ethylene methacrylic acid ester copolymer, or a combination thereof.

5. The article of claim 1, wherein the (E) montan wax comprises montanic acid wax, montan ester wax, montanic acid ester wax, or a combination thereof.

6. The article of claim 1, wherein the polyester resin composition further comprises at least one additive comprising a flame retardant, a nucleating agent, a coupling agent, filler, a plasticizer, an impact-reinforcing agent, a lubricant, an antibacterial agent, a release agent, an inorganic material additive, an ultraviolet (UV) stabilizer, an antistatic agent, a pigment, a dye or a combination thereof.

7. The article of claim 1, wherein the article exhibits a melt flow index of greater than or equal to about 71 g/10 min measured according to ASTM D1238 at a temperature of about 250° C. and a force of about 2.16 kg.

8. The article of claim 1, wherein the article exhibits a thermal distortion temperature of greater than or equal to about 169° C. measured according to ASTM D648 under a force of about 0.45 MPa.

* * * * *